US 8,109,422 B2

(12) United States Patent
Murray

(10) Patent No.: US 8,109,422 B2
(45) Date of Patent: Feb. 7, 2012

(54) COLLAPSIBLE REAR MOUNTED LOAD CARRIER FOR A VEHICLE

(75) Inventor: Frederick G. Murray, Southington, CT (US)

(73) Assignee: Thule Sweden AB, Hillerstorp (SE)

( * ) Notice: Subject to any disclaimer, the term of this patent is extended or adjusted under 35 U.S.C. 154(b) by 1065 days.

(21) Appl. No.: 11/462,000

(22) Filed: Aug. 2, 2006

(65) Prior Publication Data

US 2007/0034657 A1 Feb. 15, 2007

Related U.S. Application Data

(60) Provisional application No. 60/595,847, filed on Aug. 10, 2005.

(51) Int. Cl.
*B60R 9/10* (2006.01)

(52) U.S. Cl. ........ 224/314; 224/329; 224/497; 224/505; 224/572; 224/924

(58) Field of Classification Search .................. 224/309, 224/314, 321, 329, 497, 505, 924, 572; 108/118, 108/127, 131; 297/16.1, 16.2
See application file for complete search history.

(56) References Cited

U.S. PATENT DOCUMENTS

| 3,215,097 | A | * | 11/1965 | Bedol | 108/159 |
|---|---|---|---|---|---|
| 4,109,839 | A | * | 8/1978 | Allen | 224/314 |
| 4,182,467 | A | * | 1/1980 | Graber | 224/309 |
| 4,290,540 | A | * | 9/1981 | Allen | 224/314 |
| 4,428,516 | A | * | 1/1984 | Allen | 224/314 |
| 4,452,385 | A | * | 6/1984 | Prosen | 224/493 |
| 5,054,848 | A | * | 10/1991 | Liu | 297/39 |
| 5,056,699 | A | * | 10/1991 | Newbold et al. | 224/314 |
| 5,118,020 | A | * | 6/1992 | Piretti | 224/493 |
| 5,211,323 | A | * | 5/1993 | Chimenti et al. | 224/314 |
| 5,503,458 | A | * | 4/1996 | Petrie | 297/452.13 |
| 5,598,960 | A | * | 2/1997 | Allen et al. | 224/324 |
| 5,975,626 | A | * | 11/1999 | Aycock | 297/16.1 |
| 6,502,729 | B2 | * | 1/2003 | Ferman | 224/497 |
| 2002/0096546 | A1 | * | 7/2002 | Bogoslofski | 224/497 |
| 2002/0117524 | A1 | * | 8/2002 | Jeong | 224/314 |
| 2003/0024445 | A1 | * | 2/2003 | Nien | 108/127 |
| 2006/0138186 | A1 | * | 6/2006 | Pedrini | 224/497 |

* cited by examiner

*Primary Examiner* — Justin Larson
*Assistant Examiner* — John Cogill
(74) *Attorney, Agent, or Firm* — Novak Druce + Quigg, LLP

(57) ABSTRACT

A load carrier for a rear end of a vehicle includes a load supporting member, a mounting member including a hub connecting arm and a vehicle contacting portion, and a releasable pivot locking member. The hub connecting arm and the vehicle contacting portion are pivotally coupled to one another and the releasable pivot locking member, in a locked state, prevents pivoting movement of the hub connecting arm and the vehicle contacting portion such that the hub connecting arm and the vehicle contacting portion are disposed at an angle with respect to one another. In an unlocked state, the releasable pivot locking member allows pivoting movement of the vehicle contacting portion with respect to the hub connecting arm such that the vehicle contacting portion may be pivoted toward the hub connecting arm, e.g., as may be desired to collapse the load carrier for storage.

16 Claims, 12 Drawing Sheets

COLLAPSIBLE REAR MOUNTED LOAD CARRIER FOR A VEHICLE

FIELD OF THE INVENTION

The present invention relates generally to load carriers mountable to vehicles for transporting sports equipment, and more particularly, to load carriers mountable to rear ends of vehicles which can be readily collapsed for convenient storage or transport when not in use.

BACKGROUND OF THE INVENTION

Many types of sports equipment are usable only under certain conditions and/or in specific locales. Examples of such sports equipment include surfboards that may be used at beaches and snow skis that are normally used at ski resorts. The beach and ski areas are often remotely located from the homes of those who use them, therefore the need to transport sports equipment upon vehicles to these locations has long been recognized.

To facilitate the transportation of sports equipment, carriers mountable to passenger vehicles have been developed. There are various types of load carriers, but the most prevalent types include roof mounted carriers and rear end mounted carriers, which are generally convenient for loading bicycles onto the carriers and preventing obstruction of a driver's view. Examples of such bicycle carriers and their component structures are disclosed in U.S. Pat. No. 6,772,927 to Bogoslofski for a LOAD CARRIER FOR SPORTS EQUIPMENT, U.S. Pat. No. 5,211,323 to Chimenti et al for a BICYCLE CARRIER ADAPTED TO BE MOUNTED ON THE BACK OF A VEHICLE, U.S. Pat. No. 5,826,767 to Chimenti et al for a BICYCLE CARRIER ADAPTED TO BE MOUNTED ON THE BACK OF A VEHICLE and U.S. Pat. No. 5,363,996 to Raaber et al also entitled BICYCLE CARRIER ADAPTED TO BE MOUNTED ON THE BACK OF A VEHICLE, each of which is commonly owned together with the present invention and whose disclosures are expressly incorporated herein by reference.

The carriers described and disclosed in the above referenced patents are mountable to the rear end of a supporting passenger vehicle. The carriers incorporate mounting members that engage surfaces of a vehicle and clippable straps that, when tightened, secure the load carrier to the vehicle. The carriers further include load supporting members that extend away from the vehicle for receiving the equipment to be transported, e.g., bicycles.

A common feature of many of these known carriers is that the mounting members or the load supporting members comprise arcuate or bent members such that the carriers may be securely mounted upon a vehicle. Some mounting and load supporting members have arced or bent members such that the load carrier may be more stably secured to differently shaped vehicles and vehicles that present different portions of the vehicle, such as the trunk, hatch, or bumper for carrier engagement. In a further example, the load support members of some carriers have arced or bent portions that can be fitted about a spoiler located at the rear of the vehicle.

Despite the specific need addressed by load carriers comprising bent or arced members, these carriers can be difficult to transport or store when not in use because their arced or bent members cannot be efficiently collapsed and tend to take up significant amounts of space and is not very compact. This is a particularly important consideration where packaging of the load carrier is concerned; as packaging goes, every bit that the packaged product can be reduced results in significant savings, particularly when multiplied across many product units. In some cases the mounting members or load supporting members are separated from one another before storage or transport in order to reduce the packaged size of the load carrier. This, however, is undesirable in that loose parts are more likely to be lost from the main article than are connected or integral parts.

The inability to efficiently collapse and store known carriers comprising arced or bent members presents difficulties to manufacturers, wholesalers and retailers because these types of carrier tend to take up significant amounts of space, which renders them more expensive to store and transport, especially to and from overseas markets, and to display. For example, FIG. 1 illustrates a known load carrier 10 having a frame formed by upper and lower mounting members 12 and 14, respectively, and a pair of bicycle supporting arms 16, which project rearward from the frame. The upper and lower mounting members 12 and 14 are generally U-shaped. In the embodiment illustrated, the upper mounting member 12 has arms 18, which are secured to one another by means of bight 22 and the lower mounting member 14 has arms 20, which are connected by bight 24. Each of the arms 18 and 20 are illustrated as comprising bent portions 26 such that the mounting members may be secured to the rear end of transporting vehicle 28 and about a structure of the transporting vehicle such as a spoiler, a trunk lid, a bumper, etc.

As illustrated in FIG. 2, because the bent portions 26 allow the load carrier 10 to be secured to the rear end of a transporting vehicle and about a structure such as a spoiler, a trunk lid, a bumper, etc., when the load carrier 10 is collapsed for storage or transport, by pivoting the upper mounting member 12 and the lower mounting member 14 with respect to one another, and preferably, toward one another, the bent portions cause bights 22 and 24 to contact one another, which prevents further collapse of the structure. As a result, because further collapse of the carrier is prevented by the bights, the carrier tends to take up significant amounts of storage and transport space when not in use. Alternatively, even if the mounting members each have a perimeter that allows one of the mounting members to be received within another, the bent portions 26, nonetheless, continue to take up significant storage and transport space as the bights 22 and 24 remain oppositely disposed with respect to one another.

Furthermore, the inability to efficiently collapse known carriers also presents difficulties to the end user, who is likely to store their carrier in the trunk of their car and not want to take up significant space. Even more problematic, however, is that an end user is not likely to purchase or utilize a carrier that does not effectively collapse when not in use, or purchase or use a carrier that must be assembled or disassembled every time it is used or stored. Indeed, assembly and disassembly can be difficult, time consuming, can result in improper assembly of the carrier and damage to a vehicle, or result in the loss of carrier components. Another problem is that while many assemblies have pivoting mounting members that allow the carrier to be collapsed when they are not being used, many typically do not include means for ensuring that the mounting members are fully pivotally extended when in use, do not include locking means for locking the pivoting members in a pivotally extended position, or include means for urging the pivoting mounting members to maintain a pivotally extended position. As a result, such types of assemblies typically can only be used with certain types of transporting vehicle, are required to be precisely positioned upon transporting vehicles, can tend to be incorrectly installed upon transporting vehicles and can be unstable or prone to failure during use. An example of an assembly having one or more of the deficiencies noted above is MODEL 144A BIKE RACK™, currently commercially available from R.A. Allen Co., Inc. of Lincoln, Mass. Indeed, while the MODEL 144A BIKE RACK™ assembly comprises a pivoting lower mounting member, it does not comprise means for ensuring that the lower mounting member is fully pivotally extended when used, does not include means for locking the lower mounting member in a fully pivotally extended position, and does not include means for urging the lower mounting member to maintain a locked piston. As a matter of fact, the instructions for installing the MODEL 144A BIKE RACK™ specifically indicate that the lower mounting member must be fully extended and precisely located upon a top horizontal surface of a bumper. A problem, thus, is that a user may not fully extend the lower mounting member prior to installation, may not correctly install the carrier upon a transporting vehicle, or the lower mounting member may pivot during transport, e.g., as may occur when traveling over a rough road, such that the carrier may shift during transport and fail.

In view of the above, there is a need to provide a rear mounted load carrier that is readily and efficiently collapsible to a relatively small size, which does not require that carrier components be assembled or disassembled prior to the carrier being used or stowed, and which includes means for preventing and/or minimizing the tendency of carrier members to pivot during use.

In a related aspect, because designs of currently available rear mount load carriers generally disregard the packagable size of the collapsed carrier, the box-packaging required for shipping these carriers is typically quite bulky, with much empty space in the box around the contained carrier. In this day-in-time when products of the nature of rear mount cargo carriers might be made across the street or half-way around the world, shipping and storage becomes a paramount concern. Therefore, solutions that minimize the size (and volume) of the packaged product which must be shipped, as well as stored for varying periods at the manufacturing facility, at the retail outlet, and at various locations in between, are highly sought-after. The present solutions described and disclosed in the balance of this specification work to meet these needs and desires for more compact packaging of the load carrier manufactures, distributors, retailers and consumers.

SUMMARY OF THE INVENTION

In an effort to alleviate the detrimental and deficient effects described above, a load carrier according to the present invention incorporates a plurality of beneficial and advantageous aspects.

According to one aspect of the invention, a load carrier for a rear end of a vehicle comprises a load supporting member, a mounting member including a pair of hub connecting arms and a vehicle contacting portion, and a releasable pivot locking member. The hub connecting arms and the vehicle contacting portion are pivotally coupled to one another and the releasable pivot locking member, in a locked state, prevents pivoting movement of the hub connecting arms and the vehicle contacting portion such that the hub connecting arms and the vehicle contacting portion are disposed at an angle with respect to one another. In an unlocked state, the releasable pivot locking member allows pivoting movement of the vehicle contacting portion with respect to the hub connecting arms such that the vehicle contacting portion may be pivoted toward the hub connecting arms.

In some aspects of the invention, the releasable pivot locking member secures about the hub connecting arms and the vehicle contacting portion, and preferably, the releasable pivot locking member is slidable along one of the hub connecting arms and the vehicle contacting portion and is received by the other of the hub connecting arms and the vehicle contacting portion. In some particularly preferred aspects, the releasable pivot locking member is slidable along the hub connecting arms and is received by the vehicle contacting portion.

In some aspects of the invention, the hub connecting arms are a component of a lower mounting member of the load carrier. In some aspects, the releasable pivot locking member includes a tension strap that urges the releasable pivot locking member in a direction toward the locked state when a securing tension is applied.

In some aspects, one of the hub connecting arms and the vehicle contacting portion includes a bent portion, which forms an obtuse angle between the hub connecting arms and the vehicle contacting portion when in the locked state. In some aspects, one of the hub connecting arms and the vehicle contacting portion slidably receive the releasable pivot locking member proximate the bent portion to maintain the locked state. In some aspects, the releasable pivot locking member includes a pair of orifices, one for sliding along a length of one of the hub connecting arms and the vehicle contacting portion and the other for receiving an end of a hub connecting arm, or alternatively, the vehicle contacting portion. In some aspects, sliding movement of the releasable pivot locking member is arrested by a locking mechanism, such as a biased pin that extends through an aperture. In some aspects, the vehicle contacting portion receives the releasable pivot locking member.

In some aspects of the invention a load carrier for a rear end of a vehicle comprises a pair of load supporting members, upper and lower mounting members pivotally connected by a hub assembly wherein one of the upper and lower mounting members comprises a pair of hub connecting arms and a vehicle contacting portion, and a pair of releasable pivot locking members. The hub connecting arms and the vehicle contacting portion pivotally couple to one another by the pair of releasable pivot locking members, the releasable pivot locking members in a locked state, prevent pivoting movement of the vehicle contacting portion with respect to the hub connecting arms and to dispose the vehicle contacting portion and hub connecting arms at an angle with respect to one another. In an unlocked state, the releasable pivot locking members allows pivoting movement of the vehicle contacting portion with respect to the hub connecting arms such that the vehicle contacting portion may be pivoted toward the hub connecting arms.

In the several embodiments of the present invention that are disclosed herein, it is contemplated that the carrier may be associated with a transporting vehicle in a number of ways. The carrier may be directly connected to the rear of the vehicle. Alternatively, the carrier may be coupled to the vehicle with one or more components interposed therebetween. In any event, when the present invention is described herein as being mounted to, secured to, or otherwise associated with a vehicle, it is to be understood that the association may be direct or indirect with intermediate components therebetween.

In another, but related aspect, the compact folded nature of the carrier of the present disclosure works to solve the drawbacks associated with the large packaging that has traditionally been required when shipping folding rear mount load carriers of the type disclosed herein. Basically, the appendages of the carrier are folded together in a nested configuration with one another thereby minimizing the total volume filled by the load and carrier support assemblies. Further, the foldability of the hinged (pinned) carrier support member further works to achieve the collapsed/shipping/storage configuration of the carrier in which the hub establishes the "depth" or "thickness" dimension (d) of the collapsed load carrier. In this manner compact nature of the collapsed carrier can be fully exploited from the shipping and storage point of view.

In summary, inclusion of one or more of the above described features in a sports equipment carrier enhances the carrier's usefulness, its compatibility with variably configured supporting vehicles, and its ease of manufacture, installation and use.

BRIEF DESCRIPTION OF THE DRAWINGS

Exemplary embodiments of the disclosed inventions will now be described in greater detail and shown in the associated drawings in which like reference numerals have been used to indicate like and similar components, arrangements of components, and functional features of the same. The illustrative drawings disclose exemplary, and in some cases, alternative embodiments of the inventions in which.

DETAILED DESCRIPTION OF THE INVENTION

Figure 1:
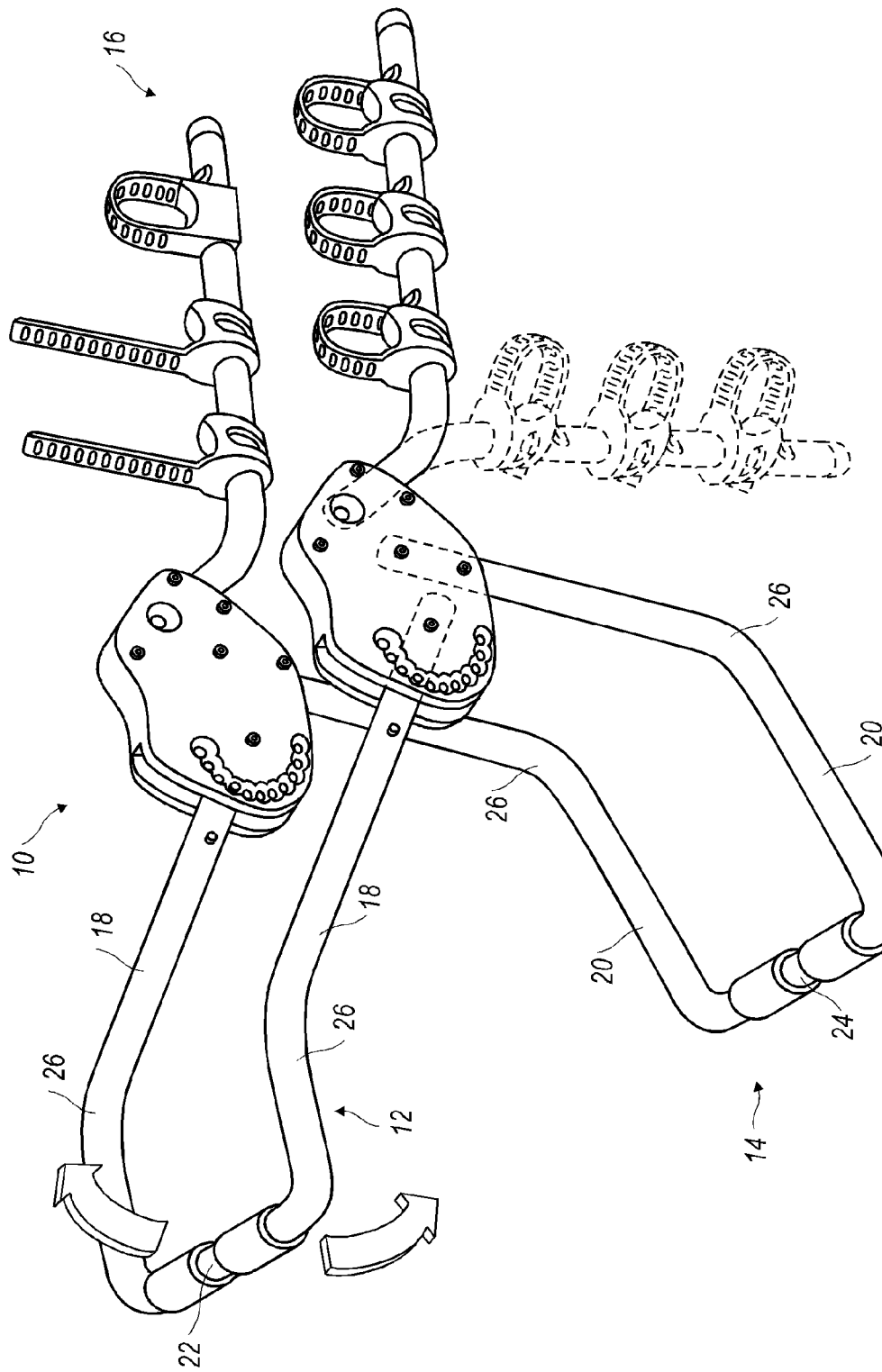
FIGS. 1 and 2 are perspective views of a known load carrier in open and collapsed configurations, respectively.

As required, detailed embodiments of the present invention are disclosed herein; however, it is to be understood that the disclosed embodiments are merely exemplary of the invention that may be embodied in various and alternative forms. It should also be appreciated that the figures are not necessarily to scale and some features may be exaggerated or minimized to show details of particular components. Therefore, specific structural and functional details disclosed herein are not to be interpreted as limiting, but are merely provided as a basis for the claims and as a representative basis for teaching one skilled in the art to variously employ the present invention.

Referring now to FIGS. 3-11, rear mounted load carrier 30 according to the present invention broadly comprises upper and lower mounting members 32, 34, respectively, which are generally adjustable and pivotally coupled to one another by means of hub members 36. Rear mounted load carrier 30 also broadly comprises load supporting members 38, which generally extend rearward from hub members 36 and are configured to receive equipment to be transported thereon, e.g., bicycles and the like. Load supporting members 38 can comprise one or more cradles 39 for securing a bicycle. Alternatively, the load supporting members 38 can take the form of skid-resistant arms (tubular steel arms preferably coated with an appropriate skid-resistant material) with upturned end portions that aid in keeping intended loads on the members 38 during transport.

Figure 2:
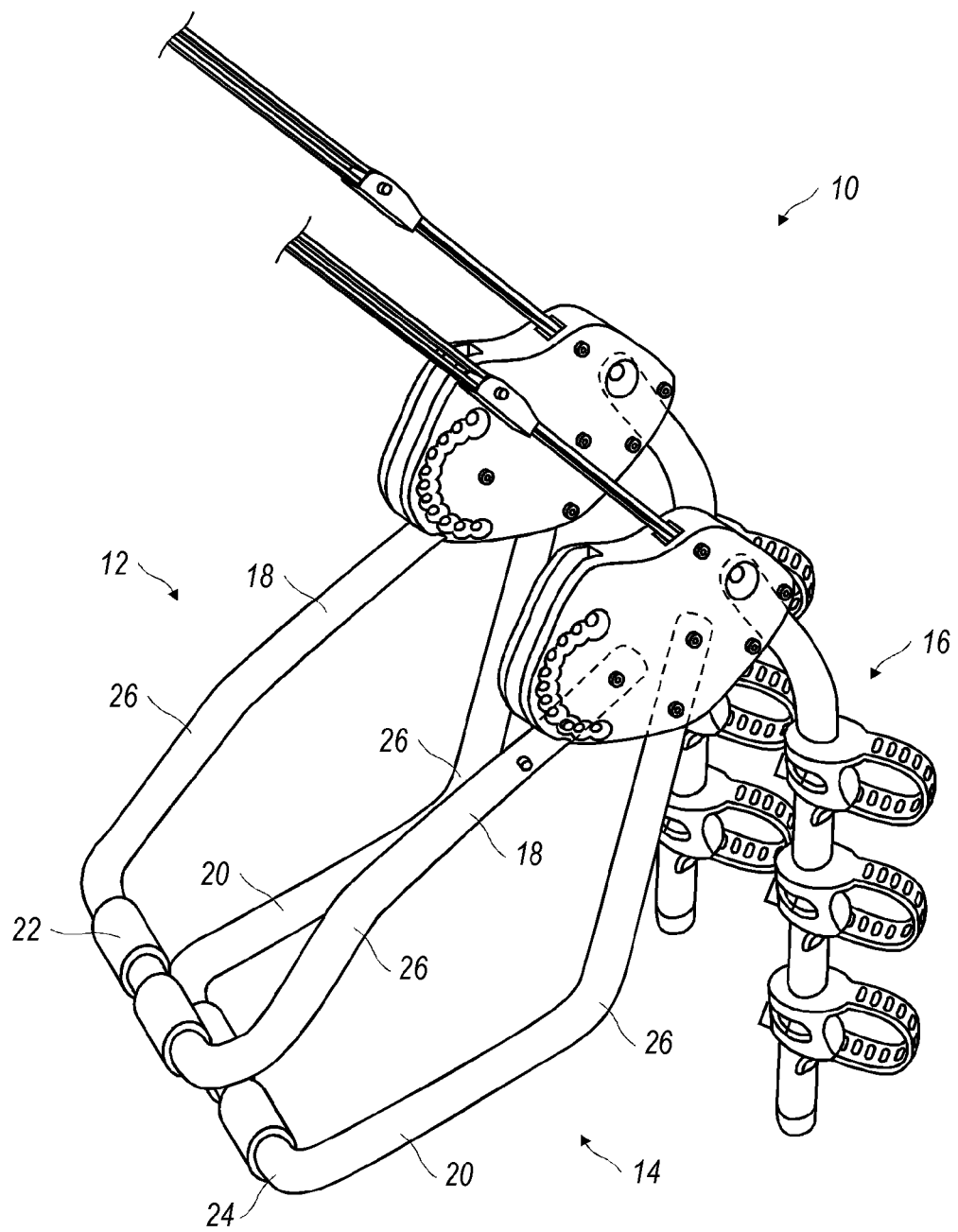
Figure 3:
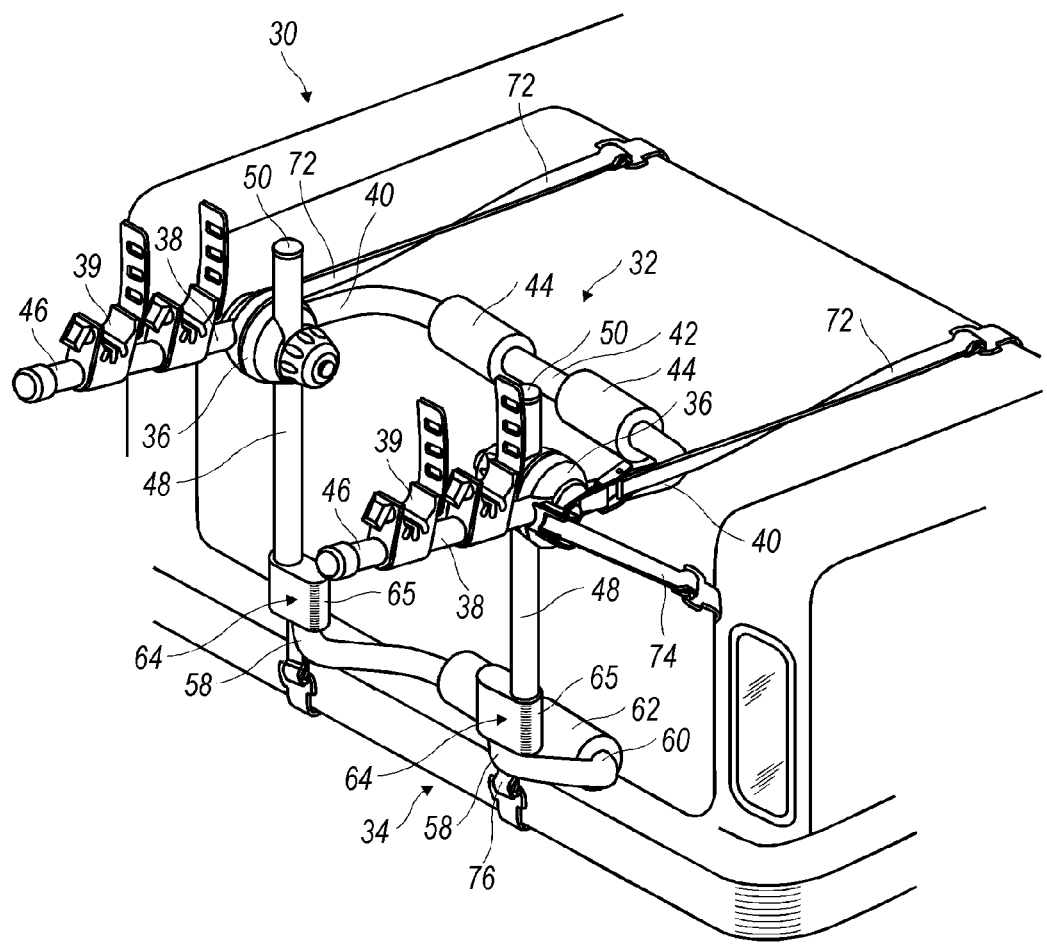
FIG. 3 is a perspective view of a load carrier according to the invention secured to a vehicle.
Figure 4:
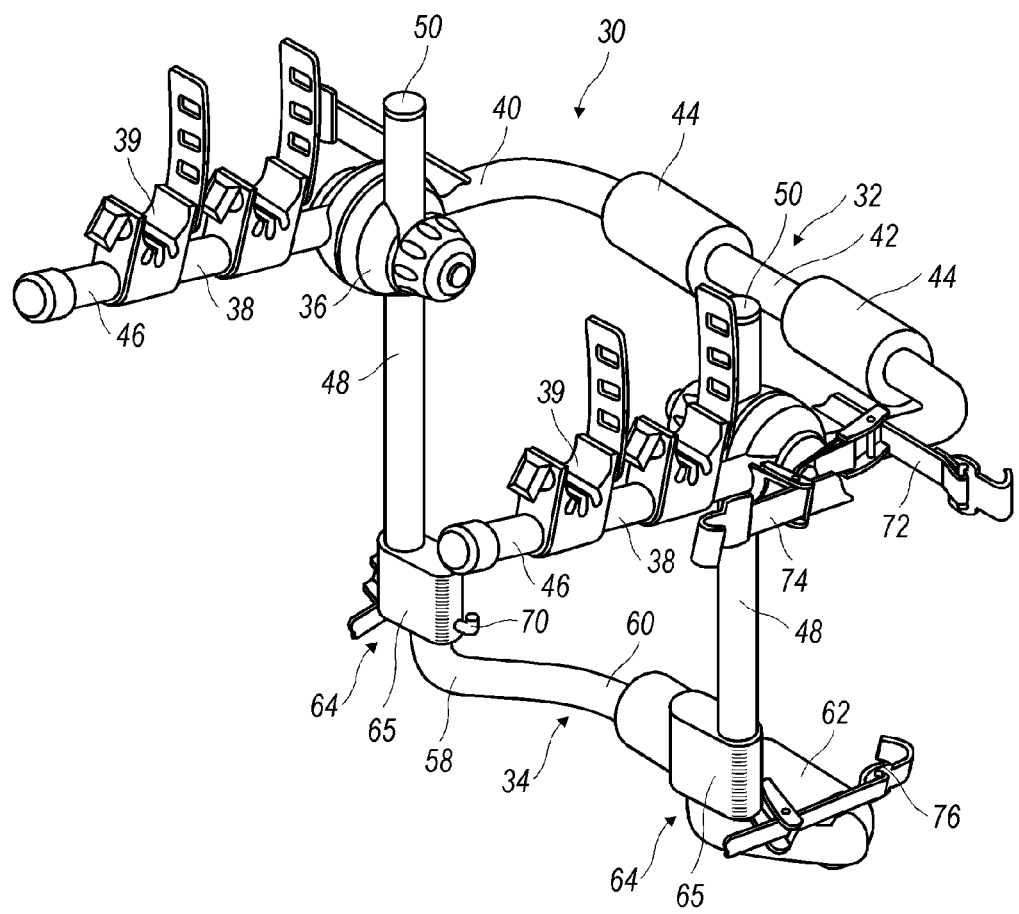
FIG. 4 is a perspective view of a load carrier according to the invention with tensioning straps shortened and vehicle deleted for clarity.
Figure 5:
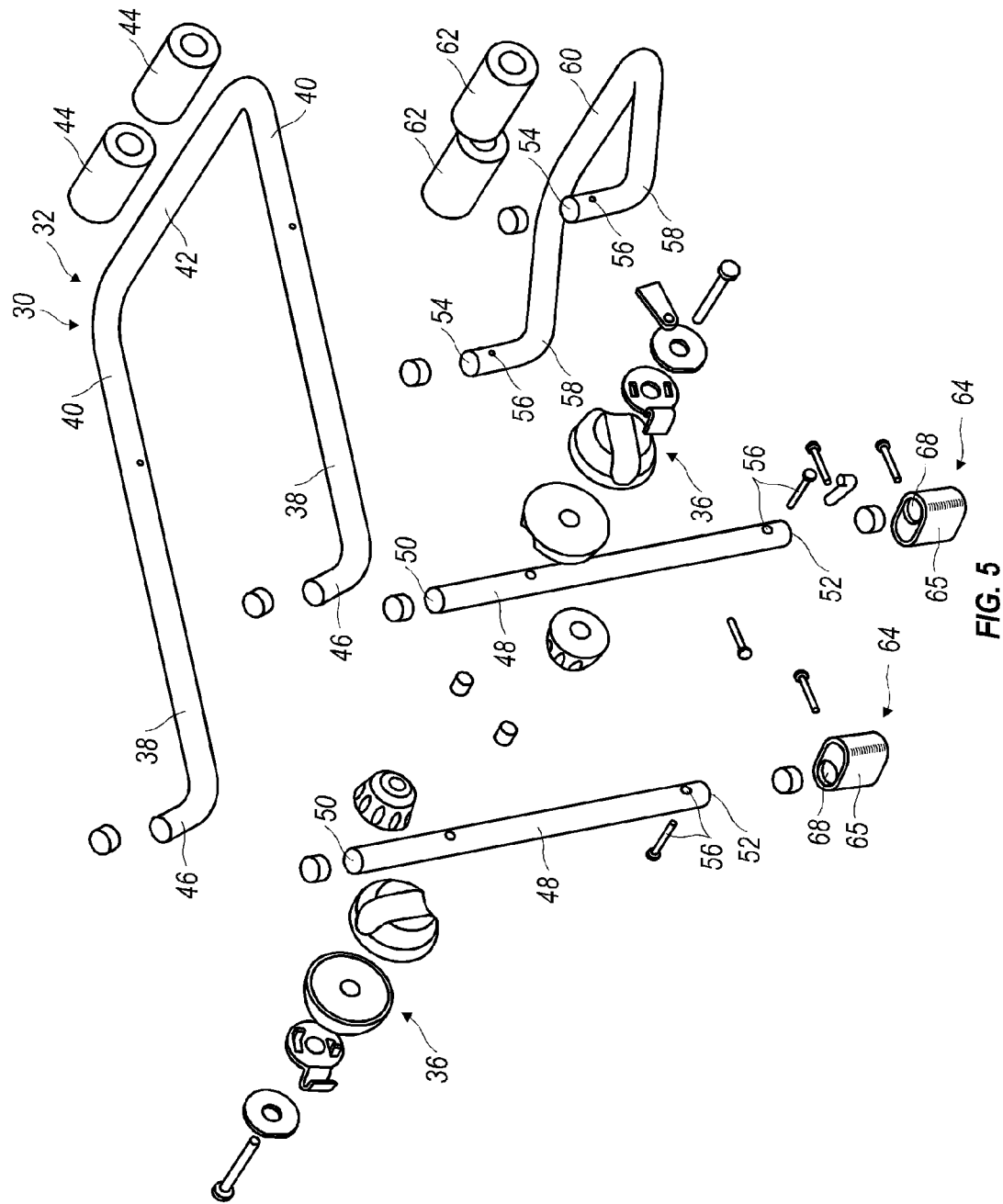
FIG. 5 is an exploded view of a load carrier according to the invention with tensioning straps and end tube end caps omitted for clarity.
Figure 6:
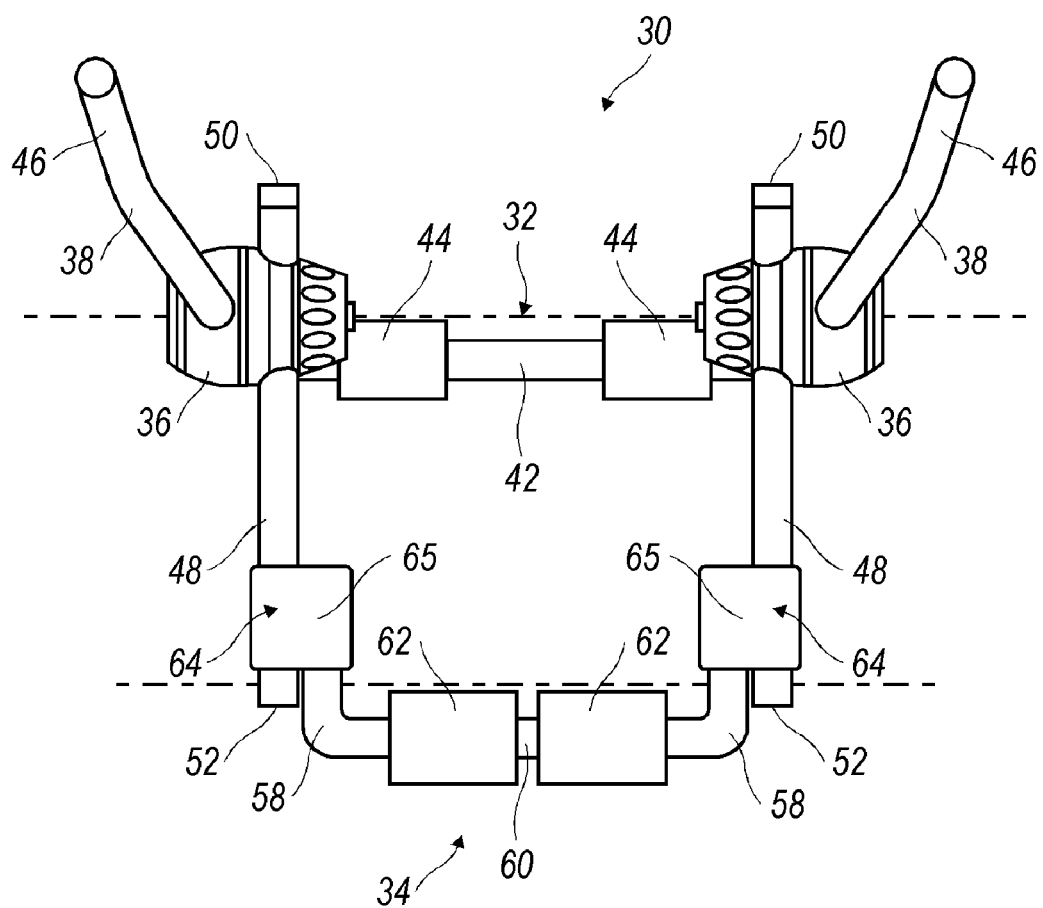
FIG. 6 is a front plan view of a load carrier according to the invention with tensioning straps omitted for clarity.
Figure 7:
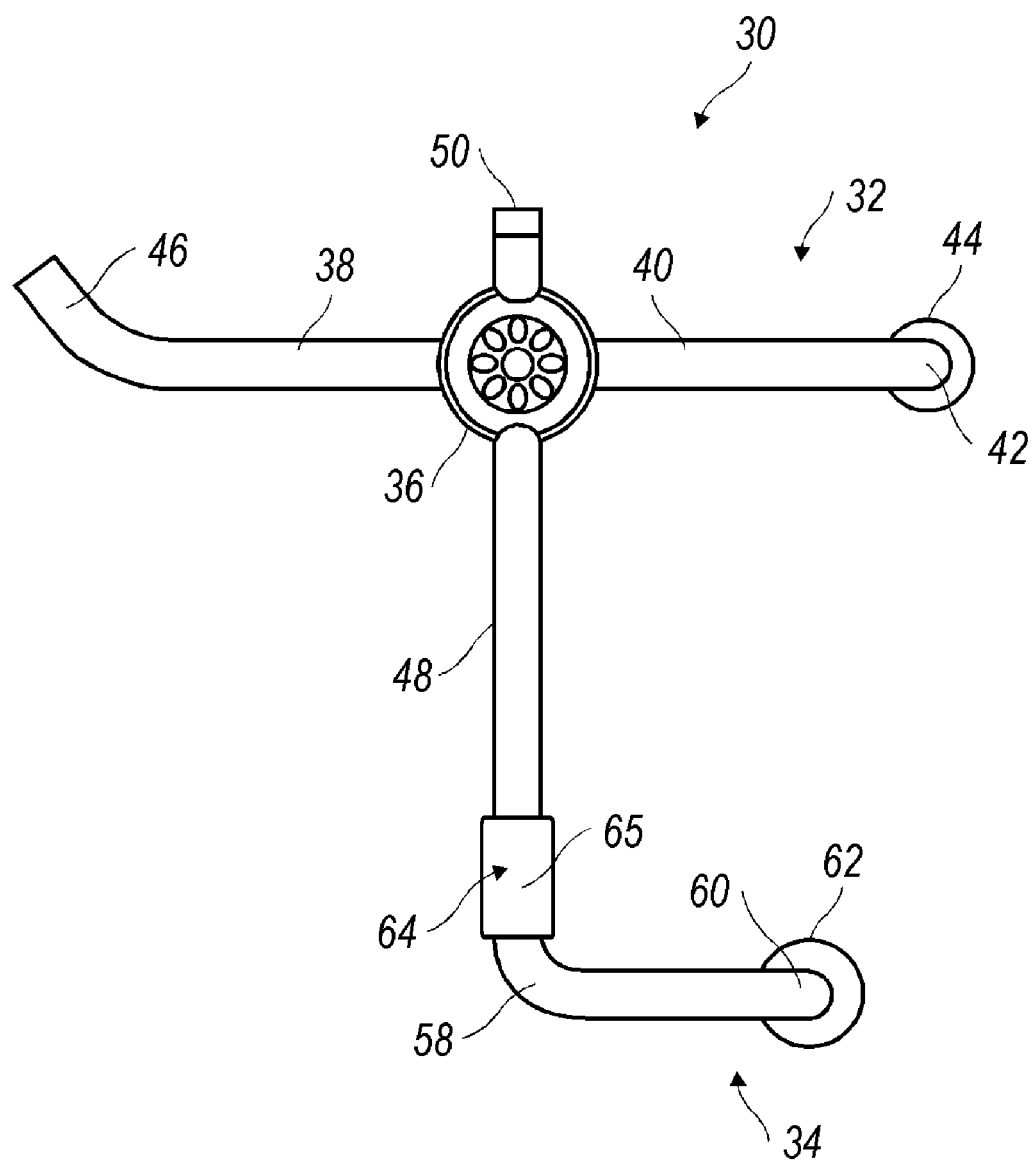
FIG. 7 is a side plan view of a load carrier according to the invention with tensioning straps omitted for clarity.
Figure 8:
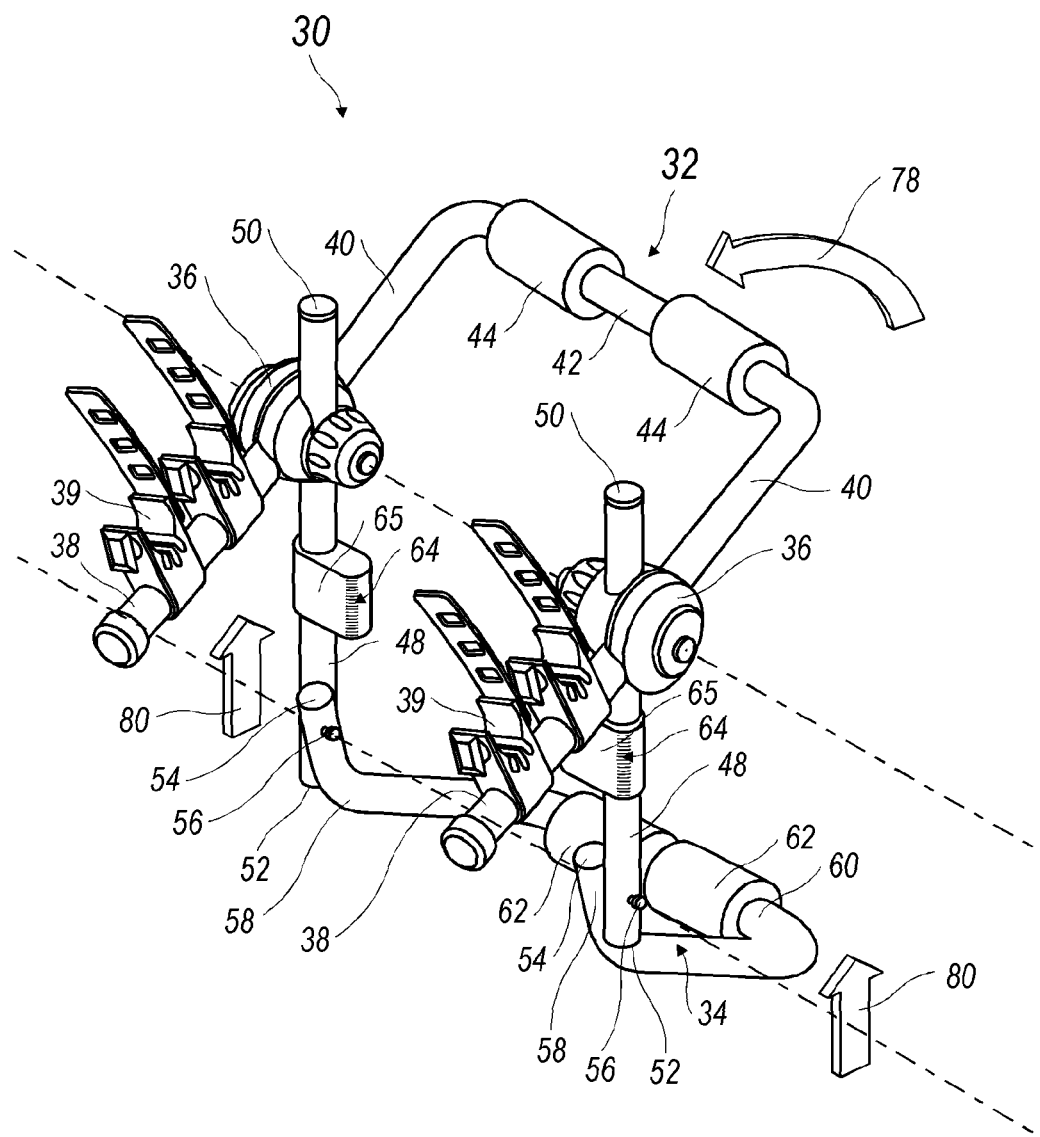
FIGS. 8-9 are perspective views illustrating a method of collapsing a load carrier according to the invention, with tensioning straps omitted for clarity.
Figure 9:
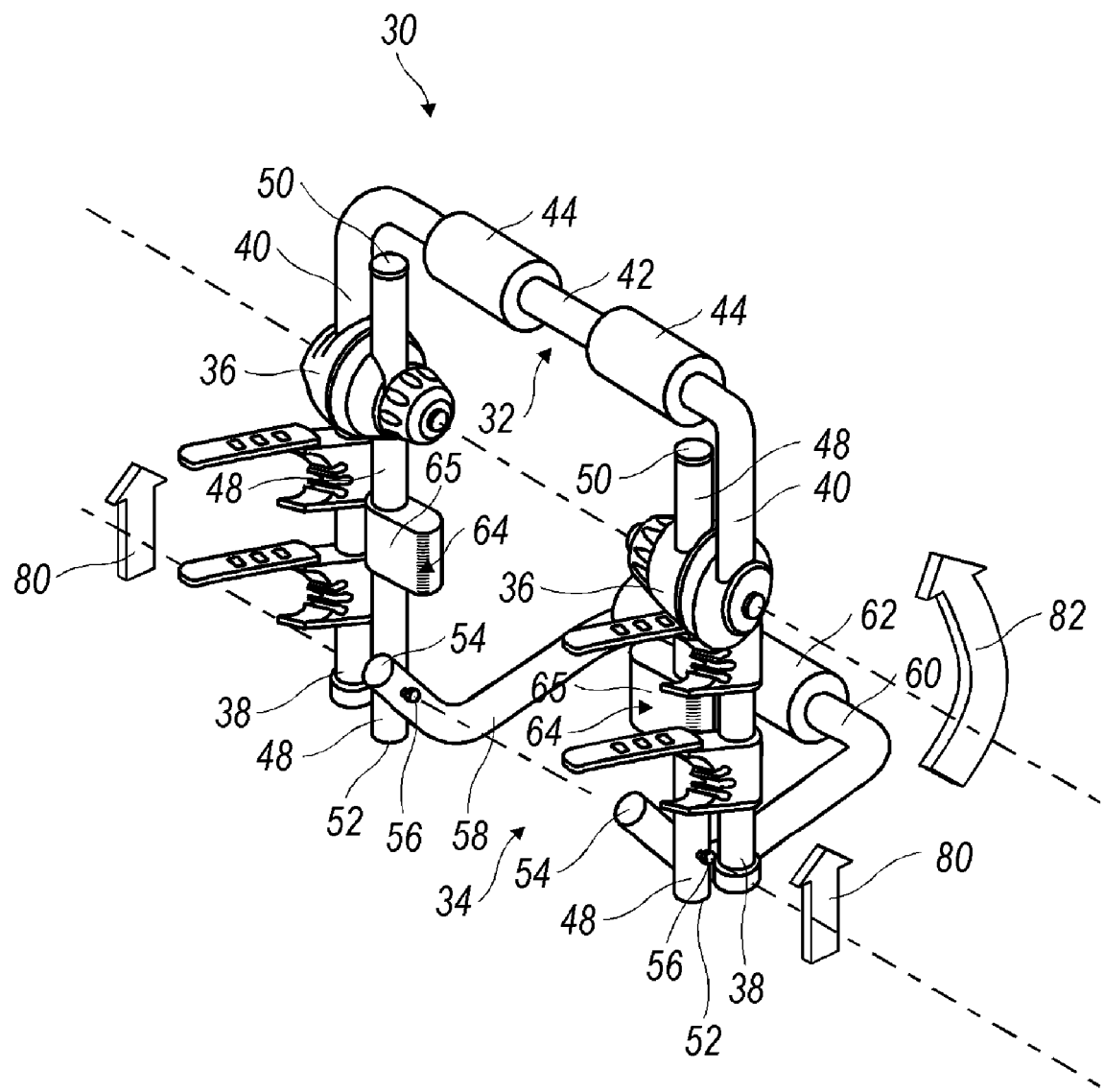

In the embodiment illustrated, upper mounting member 32 broadly comprises a pair of generally parallel arms 40, which are connected to one another by upper bight 42. Upper bight 42 of upper mounting member 32 is provided with one or more cushion members 44 so as to prevent damage to a transporting vehicle when the load carrier is secured thereto. As illustrated more clearly in the exploded view of FIG. 5, upper mounting member 32 and load supporting members 38 can be fabricated from a single shaft, are coplanar with one another, and form a general U-shaped structure; albeit, the terminal ends of load supporting members 38 can comprise angled ends 46 configured for receiving and retaining equipment on the load supporting members. It should be appreciated by those having ordinary skill in the art that while upper mounting member 32 and load supporting members 38 are illustrated as being fabricated from a single shaft, the upper mounting member and load supporting members 38 can be fabricated from separate shafts and can be configured to be adjustable and pivotally coupled to one another via hub members 36 configured therefor. As illustrated more clearly in FIG. 3, upper mounting member 32 is generally configured for contacting a top rearward surface of a transporting vehicle, such as a top surface of a trunk lid, a top surface of a vehicle hatch, or a top surface of a spare tire, etc. While upper mounting member 32 is illustrated as comprising a pair of linearly extending parallel arms 40, arms 40 may be configured to comprise bent portions, similar to those of the prior art device illustrated in FIGS. 1 and 2, such that the upper mounting member may be secured to a transporting vehicle about a vehicle structure such as a spoiler. In such configuration, upper mounting members 32 can be configured to comprise a structure that is similar to lower mounting member 34 of the present invention, as described infra, such that the load carrier may be more efficiently collapsed and stored and/or transported when not in use.

Referring again to FIGS. 3-11, lower mounting member 34 is adjustable and pivotally secured to upper mounting member by means of hub members 36. Lower mounting member 34 broadly comprises first pair of generally linearly extending parallel arms 48 that extend from, and are adjustably pivotally secured to hub member 36. As illustrated more clearly in exploded FIG. 5, arms 48, which may also be referred to as hub connecting arms 48, have first terminal ends 50, which are adjustably pivotally received by hub members 36, and second terminal ends 52, which are opposite first terminal ends 50. Hub connecting arms 48 are pivotally adjustable with respect to upper mounting member 32 and load supporting members 38. Second terminal ends 52 of the hub connecting arms pivotally couple with terminal ends 54 of lower bight 60, as by means of pivot assembly 56, which can comprise a pivot pin and pinhole. Lower bight 60, which may also be referred to as vehicle contacting portion 60, includes bent portions 58, which angularly dispose the lower bight 60 towards a transporting vehicle when the load carrier is secured thereto. Lower bight 60 can include one or more cushion members 62 so as to prevent damage to a transporting vehicle. Bent portions 58 are generally provided for allowing the lower mounting member to be secured to the vehicle upon a rear surface thereof, such as a side wall of a trunk, a bumper, etc. While bent portions 58 are preferably formed in lower bight 60, the hub connecting arms 48 could be configured to comprise the bent portions proximate their second terminal ends 52 to angularly dispose lower bight 60.

Lower mounting assembly 34 also includes a pair of releasable pivot locking members 64 for arresting pivoting movement of vehicle contacting portion 60 (lower bight 60) with respect to the hub contacting arms 48, for example, when the load carrier is secured to a vehicle. As illustrated more clearly in FIGS. 5-9, releasable pivot locking members 64 are each configured for sliding movement along hub connecting arms 48 and receive terminal ends 54 of vehicle contacting portion 60 therein. When the terminal ends 54 are fully engaged by the locking member 64, the ends 54 act as stops to that engaged locking member 64. Each releasable pivoting locking member 64 includes sleeve 65, which fits about the hub connecting arms and the terminal ends of vehicle contacting portion 60 (lower bight), and includes apertures 66 and 68. Apertures 66 are provided to receive terminal ends 54 of vehicle contacting portion 60 (lower bight) therein. Apertures 68 are provided to allow the sleeve to slide along hub connecting arms 48. In the embodiment illustrated in FIG. 4 releasable pivot locking member 64 includes locking mechanism 70 for locking the releasable pivot locking members in place about hub connecting arms 48 and the ends of vehicle contacting portion 60 (lower bight) such that pivoting movement therebetween may be arrested. Locking mechanism 70 can comprise a biased pin member communicating with a bore, a biased ball bearing assembly, a detent, etc. It should be appreciated by those having ordinary skill in the art that the present invention preferably comprises sleeve 65 capable of sliding movement along the hub connecting arms, other means for pivotally locking the vehicle contacting portion with respect to the hub connecting arms are contemplated. For example, the releasable pivot locking member could be configured to comprise a pin-type assembly or an assembly clamping about a portion of the vehicle contacting portion and the hub connecting arms, etc.

As noted, supra, a pair of hub members 36 is provided for adjustably pivotally securing the upper mounting member and the load supporting member with respect to the lower mounting member. Alternatively, each of the upper and lower mounting members and load supporting members may adjustably pivot with respect to one another. In the embodiment illustrated in FIGS. 3-4, hub members 36 pivotally secure an end of upper tensioning straps 72 and an end of lateral tensioning straps 74 thereto. Upper tensioning straps 72 are generally configured for securing the load carrier to an upper portion of a transporting vehicle, e.g., an upper edge of a trunk lid, and lateral tensioning straps 74 are configured for securing the load carrier to the opposite sides of a transporting vehicle, e.g., sides edges of a trunk lid, sides of a vehicle, etc. Releasable pivot locking member 64 secures lower tensioning straps 76 such that the load carrier can be secured to a lower portion of a transporting vehicle. A benefit of securing lower tensioning straps 76 to releasable pivot locking members 64 is that when tension is applied to the lower straps, the lower releasable pivot locking members 64 is urged toward the locking position and maintains the locked position, thereby further preventing and/or minimizing any accidental unlocking thereof.

Referring now to FIGS. 3, and 8-11, load carrier 30 according to the present invention is generally configured for effectively securing sporting equipment to a transporting vehicle when in use, and for being efficiently collapsed when not in use such that the amount of space needed to store or transport the carrier can be minimized. Generally, after the tensioning straps have been released and load carrier has been removed from a transporting vehicle, the carrier can be collapsed from the open position to the collapsed position by first loosening the hub members to allow the upper mounting member and load supporting member to be pivoted in direction 78 until load supporting members 38 and arms 40 are coplanar with respect to hub connecting arms 48. Thereafter, hub members 36 may be tightened. Locking mechanisms 70 may then be actuated to unlock releasable pivot locking members 64 such that the releasable pivot locking members can be slid along the hub connecting arms in direction 80 to expose the terminal ends of the vehicle contacting portion. At the point where the terminal ends of the vehicle contacting portion are exposed, the vehicle contacting portion may then be pivoted in direction 82 about pivot assembly 56 until its lower bight 60 is substantially coplanar with the upper mounting member and the load supporting members. The tensioning straps may then be wrapped about the lower bight 60, hub connecting arms 48 and load supporting members 38 to maintain the substantially coplanar configuration of those assemblies. Opening, or locking, of the carrier can be accomplished by reversing the above steps. As may be appreciated by those having ordinary skill in the art, locking and unlocking of a carrier according to the present invention does not necessarily require that the above steps be completed in the particular order set forth.

Figure 10:
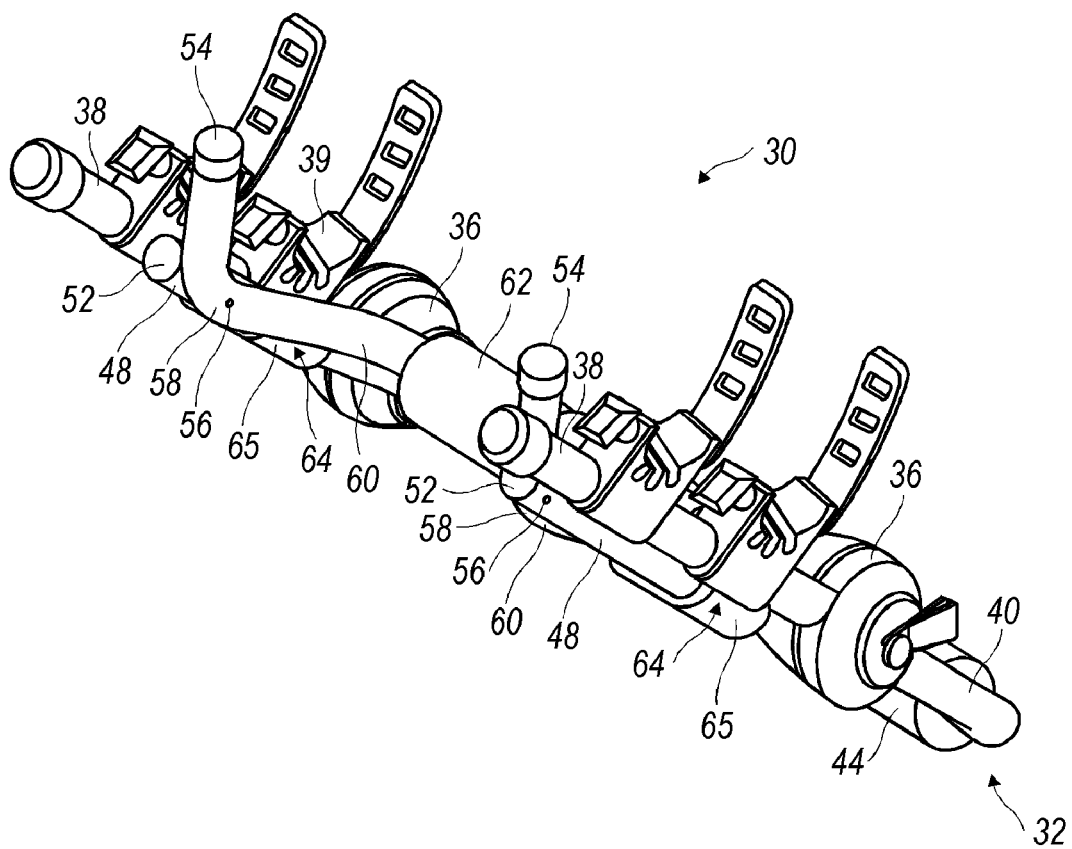
FIGS. 10 and 11 are perspective views illustrating a load carrier according to the invention in a fully collapsed configuration, with tensioning straps omitted for clarity.
Figure 11:
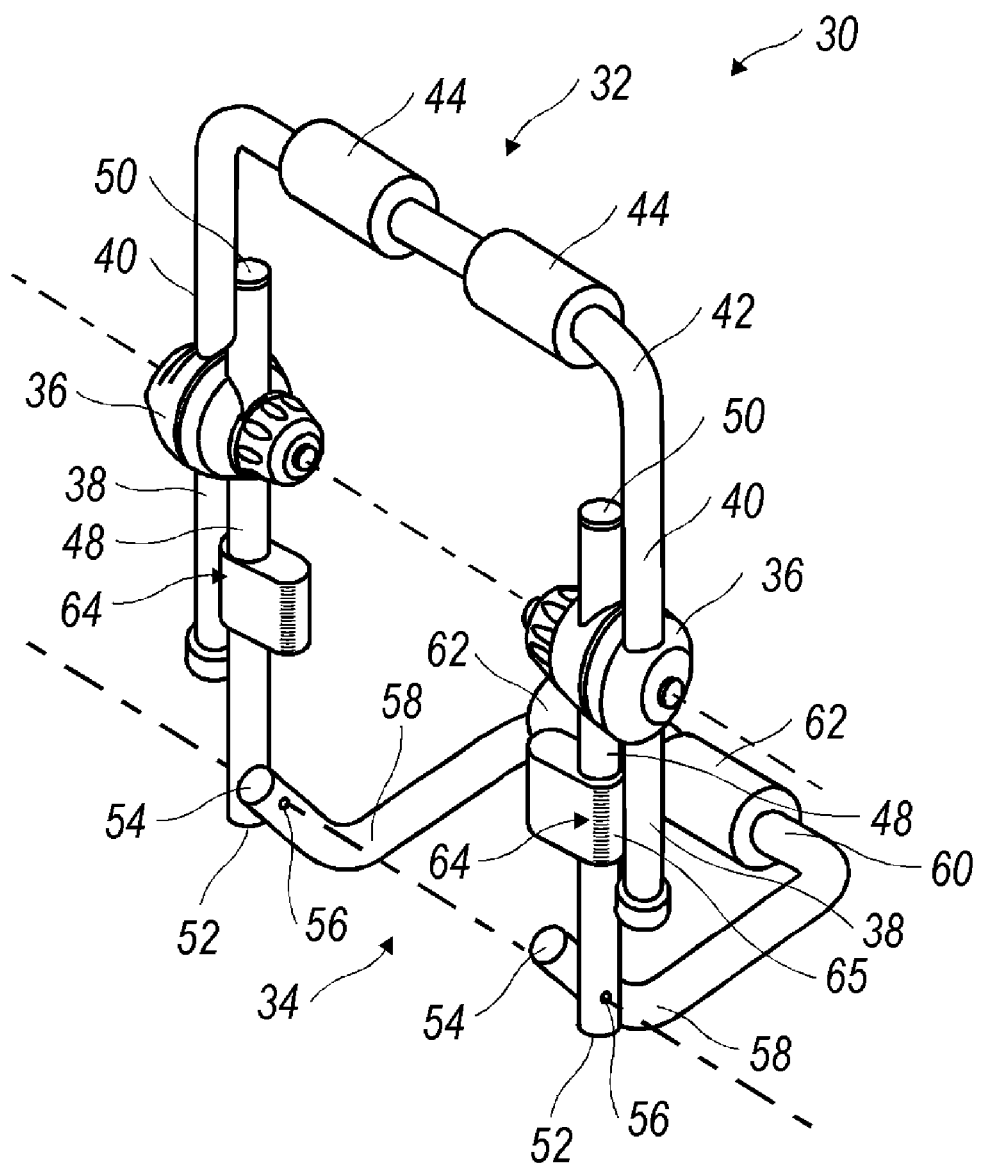
Figure 12A:
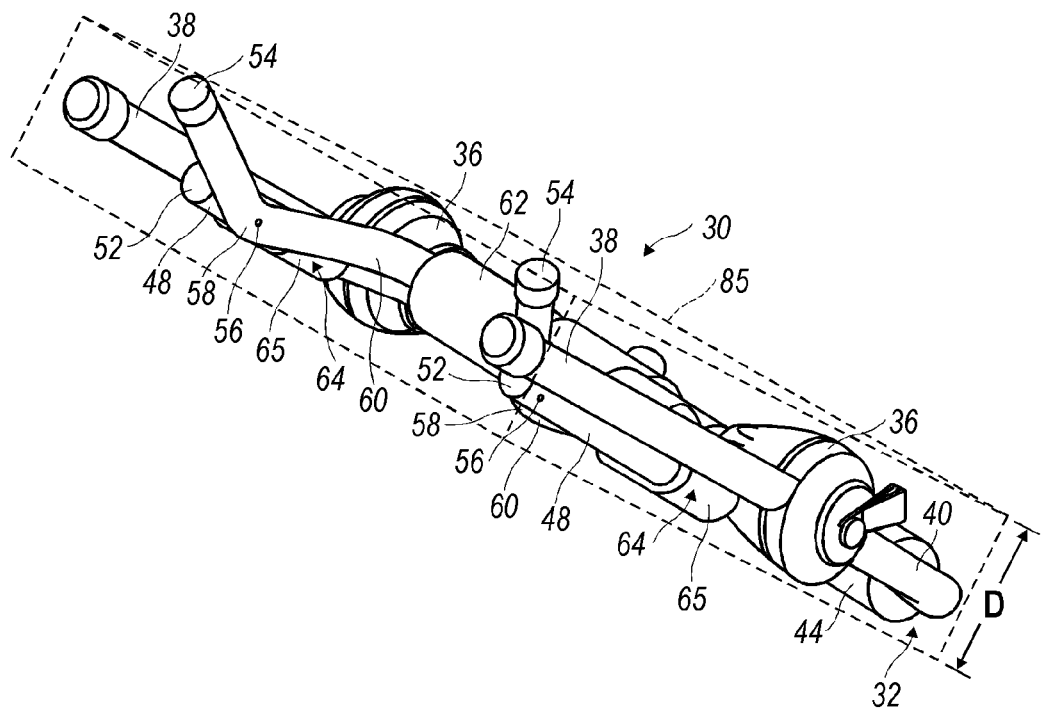
FIG. 12A is a perspective view of a collapsed load carrier in a shipping box illustrating the minimization of excess space in the box besides the load carrier.
Figure 12B:
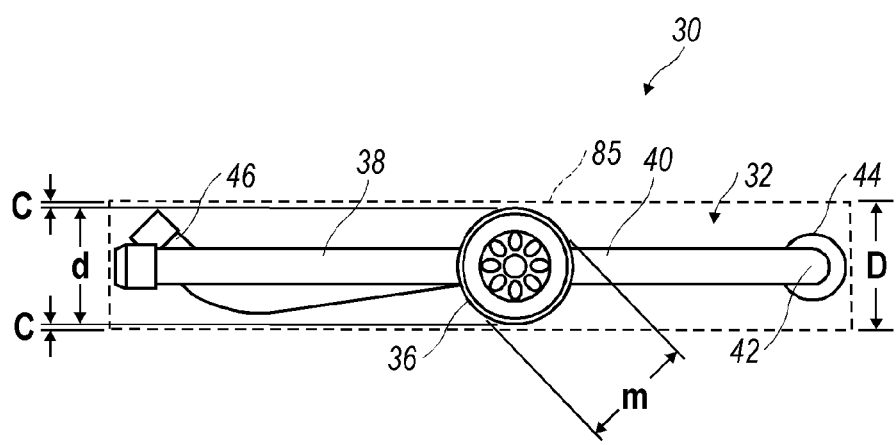
FIG. 12B is a side elevational view of the boxed load carrier of FIG. 12A demonstrating the unique and advantageous relative dimensions between certain components of the carrier and the interior space of the shipping box.

An alternative aspect of the present invention is demonstrated in FIGS. 12A and 12B where the collapsed load carrier 30 of FIG. 10 is shown with the cradles 39 removed and the carrier 30 is packed into a shipping box 85. The box 85 is shown in phantom to help illustrate the relative dimensions and interaction between the carrier 30 and the interior space of the box 85 in order to minimize the size and volume of the final packaged product. A boxed load carrier 30, that when in use is configured to be carried on a vehicle in abutting engagement with a backside of the vehicle, is illustrated in FIGS. 12A and 12B.

The illustrated arrangement of FIGS. 12A and 12B comprises a shipping box 85 configured to receive a load carrier 30 therein when the load carrier 30 is in a collapsed shipping configuration. The load carrier 30 comprises a hub assembly that includes a pair of hubs or hub members 36. Each hub 36 is configured for rigid engagement with a plurality of load bearing assemblies 38, 40, 48, the load bearing assemblies including at least one load receiver 38 and at least one carrier support 32, 34. The hub assembly is configured to facilitate pivotation between at least one of the load receivers 38 if there are several and at least one carrier support 32, 34 if there is more than one. The carrier support 32, 34 comprises an elongate extension portion 48 pivotally interconnected with a vehicle engaging portion 58, the vehicle engaging portion 58 having a curved portion located adjacent to a pivot-point 56 of interconnection between the elongate extension portion 48 and the vehicle engaging portion 58.

The hub assembly is configured to permit relative pivotation between the plurality of load bearing assemblies 38, 40, 48 thereby permitting transformation between an expanded load carrying configuration (see FIG. 7) and the collapsed shipping configuration of FIGS. 12A and 12B. The load carrier 30, when in the collapsed shipping configuration, presents an exterior depth dimension (d) approximately equal to a minimum cross-wise dimension (m) of one of the hubs 36 of the hub assembly.

As illustrated, the hub 36 is round and therefore has a uniform minimum cross-wise dimension (m); however, it is contemplated that the teachings of the present invention apply to non-circularly shaped hubs 36 and which will have cross-wise dimensions (m), the smallest of which must be identified. The load carrier 30, when in the shipping configuration, is dimensioned to fit into the shipping box 85 that has an interior depth dimension (D) approximately equal to the minimum cross-wise dimension (m) of one of the hubs 36 of the hub assembly, plus a nominal clearance distance (C) provided between the hub(s) 36 of the hub assembly and an interior of the shipping box 85 located adjacent to the particular hub in the shipping configuration in which the load carrier is packed in the shipping box as demonstrated in FIGS. 12A and 12B.

The load carrier 30, when in the shipping configuration, has an exterior depth dimension (d) not more than approximately one inch greater than the minimum cross-wise dimension (m) of the hub assembly. Furthermore, the nominal clearance distance (C), when in the shipping configuration, is not more than approximately one inch greater than the minimum cross-wise dimension (m) of the hub assembly.

Although the invention has been described in connection with preferred embodiments thereof, it will be appreciated by those skilled in the art that additions, modifications, substitutions and deletions not specifically described may be made without departing from the spirit and scope of the invention as defined in the claims.

Bicycle carriers adapted to be mounted on the back of a vehicle have been disclosed and their components described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A load carrier for a rear end of a vehicle comprising:
   a load supporting member;
   a releasable pivot locking member; and
   a mounting member comprising a hub connecting arm and a vehicle contacting portion, said hub connecting arm and said vehicle contacting portion pivotally coupled to one another, said releasable pivot locking member, in a locked state, preventing pivoting movement of said hub connecting arm and said vehicle contacting portion relative to one another to dispose said hub connecting arm and a portion of said vehicle contacting portion at an angle, and in an unlocked state, allowing pivoting movement of said vehicle contacting portion with respect to said hub connecting arm such that said vehicle contacting portion is pivotal toward said hub connecting arm;
   wherein said releasable pivot locking member is slideable from a first position to a second position along the longitudinal length of one of said hub connecting arm and said vehicle contacting portion, wherein in said first position said releasable locking member engages both of said hub connecting arm and vehicle contacting portion to achieve said locked state and in said second position said releasable locking member engages only one of said hub connecting arm and vehicle contacting portion for said unlocked state and
   wherein said releasable pivot locking member includes a pair of apertures for sliding along the length and receiving one of said hub connecting arm and said vehicle contacting portion;
   wherein said releasable pivot locking member comprises a tensioning strap, said tensioning strap urging said releasable pivot locking member in a direction toward said locked state when a securing tension is applied thereto.

2. The load carrier of claim 1 wherein said releasable pivot locking member is configured to secure about said hub connecting arm and said vehicle contacting portion.

3. The load carrier of claim 2 wherein one of said hub connecting arm and said vehicle contacting portion comprises a bent portion forming an obtuse angle between said hub connecting arm and said vehicle contacting portion, when said load carrier is in said locked state.

4. The load carrier of claim 3 wherein said releasable pivot locking member is configured to secure about said hub connecting arm and said vehicle contacting portion proximate said bent portion.

5. The load carrier of claim 4 wherein said vehicle contacting portion comprises said bent portion.

6. The load carrier of claim 1 wherein said releasable pivot locking member includes a locking assembly for locking said member in the locked position.

7. The load carrier of claim 6 wherein said locking assembly comprises a biased pin member.

8. The load carrier of claim 1 wherein said hub connecting arm is a component of a lower mounting member.

9. The load carrier of claim 1 wherein said vehicle contacting portion receives said releasable pivot locking member.

10. The load carrier of claim 1 wherein said load carrier comprises a plurality of releasable pivot locking members.

11. The load carrier of claim 1 wherein said mounting member comprises a lower mounting member.

12. The load carrier of claim 1, wherein said hub connecting arm and said vehicle contacting portion are pivotally coupled to one another around a pivot point extending through said hub connecting arm and said vehicle contacting portion.

13. A load carrier for a vehicle comprising:
   a pair of load supporting members;
   upper and lower mounting members pivotally connected by a hub assembly, one of said upper and lower mounting members comprising a pair of hub connecting arms extending from said hub assembly on one end and having a second end pivotally coupled to a vehicle contacting portion; and
   a pair of releasable pivot locking members, said hub connecting arms and said vehicle contacting portion pivotally coupled to one another by said pair of releasable pivot locking members, said releasable locking members in a locked state, preventing pivoting movement of said hub connecting arms and said vehicle contacting portion to dispose said hub connecting arms and said vehicle contacting portion at an angle with respect to one another, and in an unlocked state, allowing pivoting movement of said vehicle contacting portion with respect to said hub connecting arms such that said vehicle contacting portion may be pivoted toward said hub connecting arms;
   wherein said releasable pivot locking member is slidable from first position to a second position along the longitudinal length of the hub connecting arm, wherein in said first position, said releasable locking pivot member engages both said hub connecting arm and said vehicle contacting portion preventing pivoting movement whereby said locked state is achieved and in said unlocked state said releasable pivot locking member does not engage said vehicle contact portion allowing pivoting movement whereby said unlocked state is achieved, and wherein said releasable pivot locking member includes a pair of apertures for sliding along the length and receiving one of said hub connecting arm and said vehicle contacting portion wherein said releasable pivot locking member comprises a tensioning strap, said tensioning strap urging said releasable pivot locking member in a direction toward said locked state when a securing tension is applied thereto.

14. A load carrier configured to be carried on a vehicle in abutting engagement with a backside of the vehicle, said load carrier comprising:

a hub assembly comprising a pair of hubs, each hub configured for rigid engagement with a plurality of load bearing assemblies and having apertures for receiving said load bearing assemblies, said load bearing assemblies including at least one load receiver and at least one carrier support, said hub assembly configured to facilitate pivotation between said at least one load receiver and said at least one carrier support;

said at least one carrier support comprising an elongate extension portion extending from said hub assembly on one end and a vehicle engaging portion being pivotally coupled to a second end of said elongate extension portion and said vehicle engaging portion having a curved portion located adjacent to a pivot-point of interconnection between said elongate extension portion and said vehicle engaging portion; a pair of releasable pivot locking members, said vehicle engaging portion and said elongate extension portion pivotally coupled to one another by said pair of releasable pivot locking members, said releasable locking members in a locked state, preventing pivoting movement of said vehicle engaging portion and said elongate extension portion to dispose said vehicle engaging portion and said elongate extension portion at an angle with respect to one another, and in an unlocked state, allowing pivoting movement of said vehicle engaging portion and said elongate extension portion such that said vehicle engaging portion maybe pivoted toward said elongate extension portion;

said hub assembly configured to permit relative pivotation between said plurality of load bearing assemblies thereby permitting transformation between an expanded carrying configuration and a collapsed and nested shipping/storage configuration; and said load carrier, when in said nested shipping/storage configuration, presenting an exterior depth dimension (d) approximately equal to a minimum cross-wise dimension (m) of one of said hubs of said hub assembly;

wherein said releasable pivot locking member comprises a tensioning strap, said tensioning strap urging said releasable pivot locking member in a direction toward said locked state when a securing tension is applied thereto.

15. The load carrier of claim 14, wherein said load carrier, when in said nested shipping/storage configuration has an exterior depth dimension (d) not more than approximately one inch greater than the minimum cross-wise dimension (m) of one of said hubs of said hub assembly.

16. The load carrier of claim 14, further comprising a releasable pivot locking member, wherein said releasable pivot locking member, in a locked state, prevents pivoting movement of said vehicle engaging portion and in an unlocked state, allowing pivoting movement of said vehicle engaging portion with respect to said elongate extension portion.

\* \* \* \* \*